United States Patent
Kim

(10) Patent No.: US 8,195,455 B2
(45) Date of Patent: *Jun. 5, 2012

(54) APPARATUS AND METHOD FOR SOUND RECOGNITION IN PORTABLE DEVICE

(75) Inventor: Hyun Soo Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 653 days.

This patent is subject to a terminal disclaimer.

(21) Appl. No.: 12/388,188

(22) Filed: Feb. 18, 2009

(65) Prior Publication Data

US 2009/0210223 A1 Aug. 20, 2009

(30) Foreign Application Priority Data

Feb. 19, 2008 (KR) .............................. 2008-0014968

(51) Int. Cl.
G10L 15/00 (2006.01)
(52) U.S. Cl. .......................... 704/231; 704/243; 704/240
(58) Field of Classification Search .................. 704/200, 704/211, 212, 203, 227, 236, 231, 235, 255, 704/243, 240, 244

See application file for complete search history.

(56) References Cited

U.S. PATENT DOCUMENTS

| 4,783,807 | A | * | 11/1988 | Marley | 704/235 |
| 5,825,977 | A | * | 10/1998 | Morin et al. | 704/255 |
| 6,959,278 | B1 | * | 10/2005 | Shu et al. | 704/243 |
| 2003/0033145 | A1 | * | 2/2003 | Petrushin | 704/236 |

OTHER PUBLICATIONS

Kim et al., "Nonparametric Peak Feature Extraction and its Applications to Speech Signals", in Proc. Eighth Aust. Int. Conf. on Speech Science and Technology (SST 00), Dec. 5-7, 2000, pp. 256-261.*

* cited by examiner

*Primary Examiner* — Huyen X. Vo
(74) *Attorney, Agent, or Firm* — The Farrell Law Firm, P.C.

(57) ABSTRACT

Provided are an apparatus and a method capable of recognizing a sound through a reduced burden of computations and a noise-tolerant technique. The sound recognition apparatus in a portable device includes a memory unit that stores at least one base sound and a sound input unit that receives a sound input. The sound recognition apparatus also includes a control unit that receives the sound input from the sound input unit, extracts peak values of the sound input, calculates statistical data by using the peak values, and determines whether the sound input is equal to a base sound by using the statistical data.

23 Claims, 3 Drawing Sheets

APPARATUS AND METHOD FOR SOUND RECOGNITION IN PORTABLE DEVICE

PRIORITY

This application claims priority to an application entitled "APPARATUS AND METHOD FOR SOUND RECOGNITION IN PORTABLE DEVICE" filed in the Korean Intellectual Property Office on Feb. 19, 2008 and assigned Serial No. 10-2008-0014968, the contents of which are incorporated herein by reference.

BACKGROUND OF THE INVENTION

1. Field of the Invention

The present invention relates generally to sound recognition technology and, more particularly, to an apparatus and a method capable of recognizing a sound.

2. Description of the Related Art

A spoken interaction between a human and a machine has long been a dream of mankind and a field of research. Advantages of a spoken interaction with a machine are as follows. First, since spoken words are the easiest means of input for a human, it needs no practice unlike a traditional input manner using a keyboard. Second, a spoken input is much faster, perhaps twice to six times as fast as a keyboard input. Third, a spoken input is a hands and feet free input, so an input is possible even while walking.

In general sound recognition, including speech recognition or voice recognition, is to receive a sound input and to convert it into a machine-readable input. In addition to a human voice, such sound recognition may be applied to many kinds of sounds such as a handclap sound, a door opening or closing sound, a doorbell sound, a buzzer sound, and an automobile horn sound. Furthermore, sound recognition allows appliance control, data entry, document preparation, etc., and may have a great variety of applications such as a voice-controlled computer, voice dialing, a voice guide system, home automation, a car navigation system, and so forth.

Conventional sound recognition requires a very complicated process of separating a sound into distinct phonemes (i.e., phoneme segmentation) and recognizing individual segmented phonemes (i.e., phoneme awareness). Unfortunately, this may have some drawbacks such as a burden of computations or poor accuracy in recognition due to oversensitivity to noises.

SUMMARY OF THE INVENTION

Accordingly, the present invention is to provide an apparatus and a method capable of recognizing a sound through a reduced burden of computations and a noise-tolerant technique.

According to an aspect of the present invention, a sound recognition apparatus in a portable device includes a memory unit storing a base sound; a sound input unit receiving a sound input; and a control unit receiving the sound input from the sound input unit, extracting peak values of the sound input, calculating statistical data by using the peak values, and determining whether the sound input is equal to the base sound by using the statistical data.

According to another aspect of the present invention, a sound recognition method in a portable device includes extracting peak values of a sound input; calculating statistical data by using the peak values; and determining whether the sound input is equal to a base sound by using the statistical data.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention. Furthermore, well known or widely used techniques, elements, structures, and processes may not be described or illustrated in detail to avoid obscuring the essence of the present invention.

Sound recognition according to the present invention stores in advance features of a sound (e.g., a handclap sound, a door opening or closing sound, a doorbell sound, a buzzer sound, an automobile horn sound, etc.) and then determines whether a sound input is equal to a pre-stored sound.

A sound recognition apparatus and a related method of the present invention may be applicable to typical portable devices, also known as mobile devices, handheld devices, etc., including mobile communication devices, digital broadcast devices, mobile computers, personal digital assistants, smart phones, IMT-2000 devices, WCDMA devices, UMTS devices, notebooks, personal computers, MP3 players, handheld game consoles, media recorders, media players/displayers, and personal navigation devices.

Figure 1:
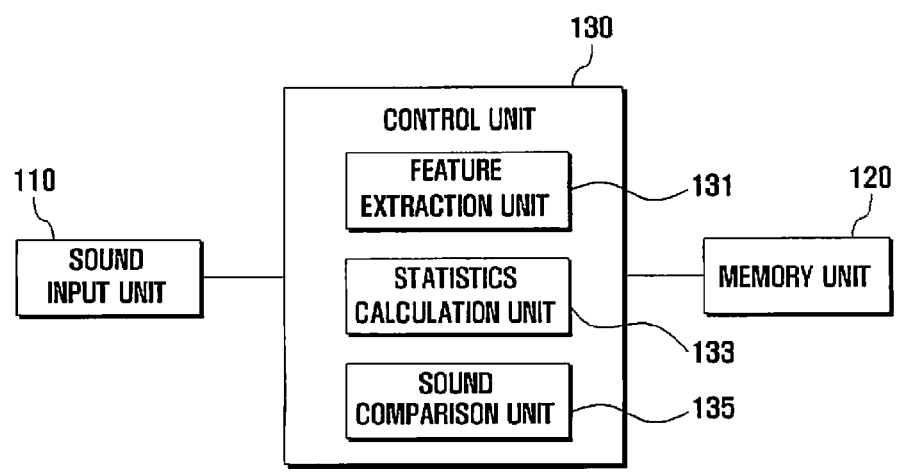
FIG. 1 is a block diagram illustrating a sound recognition apparatus in a portable device according to an exemplary embodiment of the present invention.

FIG. 1 illustrates, in a block diagram, a sound recognition apparatus in a portable device according to an exemplary embodiment of the present invention.

Referring to FIG. 1, the sound recognition apparatus includes a sound input unit 110, a memory unit 120, and a control unit 130. The control unit 130 includes a feature extraction unit 131, a statistics calculation unit 133, and a sound comparison unit 135.

The sound input unit 110 receives a sound input and conveys the sound input to the control unit 130.

Sound recognition of the invention compares a sound input with a pre-stored sound and thereby determines whether both sounds are the same. A pre-stored sound is input in advance through the sound input unit 110 and used to ascertain the identity of a new sound input. Hereinafter, such a pre-stored sound is referred to as "a base sound".

The memory unit 120 stores a variety of base sounds and their features. The memory unit 120 stores peak values and probability values as the features of the base sounds when a probability distance model is used. Alternatively, the memory unit 120 stores the number of hidden nodes and a neural network learning database, i.e., histogram database of peak values, as the features of the base sounds when a neural network is used. These features will be described in detail later.

The control unit 130 receives a sound input from the sound input unit 110, extracts the features of a sound input, and then stores the features in the memory unit 120. Additionally, the control unit 130 compares a sound input with a pre-stored base sound and thereby determines whether a sound input is equal to a base sound.

For the determination of the identity of sounds, the control unit 130 includes the feature extraction unit 131, the statistics calculation unit 133, and the sound comparison unit 135.

The feature extraction unit 131 extracts peak values of a sound input signal in a time domain or in a frequency domain. For the extraction of peak values, it does not matter whether a sound input signal has a time domain wave form or a frequency domain wave form. Since a sound input signal has a time domain wave form, the feature extraction unit 131 converts a time domain signal to a frequency domain signal so as to obtain a frequency domain wave form. Preferably, Discrete Fourier Transform (DFT) or Fast Fourier Transform (FFT) may be used for a conversion from a time domain to a frequency domain.

Peak values have positive peak values and negative peak values, which may also be referred to as the relative maximum values and the relative minimum values, respectively.

After extracting peak values of a sound input signal, the feature extraction unit 131 again extracts peak values of the previously extracted peak values. In an embodiment of the present invention, a peak value extracted from a sound input signal is referred to as a first degree peak value. Furthermore, the next peak value extracted from the first degree peak value is referred to as a second degree peak value. In such a manner, a higher degree peak value is extracted from a lower degree peak value. Finally, only one peak value is obtained through a continuous extraction.

Inherently a sound signal contains many kinds of undesired noises generated by unfavorable surroundings and a defective performance of an input device. Therefore, the feature extraction unit 131 removes noise from a sound input signal. Additionally, to selectively only extract meaningful peak values, the feature extraction unit 131 may further remove minor signals under a critical level. Alternatively, instead of removing minor signals, the feature extraction unit 131 may exclude minor signals from the extraction of peak values.

The statistics calculation unit 133 calculates the arithmetic mean and the standard deviation of the relative maximum values from extracted peak values. Similarly, the statistics calculation unit 133 calculates the arithmetic mean and the standard deviation of the relative minimum values from extracted peak values.

The sound comparison unit 135 determines whether a sound input is equal to a pre-stored base sound by using the probability distance model or the neural network model. Additionally, the sound comparison unit 135 uses, as input values for determination, the arithmetic mean and the standard deviation that was calculated by the statistics calculation unit 133.

Although not illustrated, the sound recognition apparatus of the invention may further and selectively include other units such as an RF module, a display module, a broadcast receiver module, a camera module, a rechargeable battery, an MP3 module, and so forth. Since portable devices today may vary with a convergence trend of digital appliances, it will be appreciated by those skilled in the art that any other equivalents for the above-listed units may be favorably added to the sound recognition apparatus of the invention.

As discussed above, the sound recognition apparatus according to an embodiment of the invention removes noise from a sound input signal and then optionally removes minor signals under a critical level to selectively only extract meaningful peak values. A method for selecting such meaningful signals will now be described with reference to FIG. 2.

Figure 2:
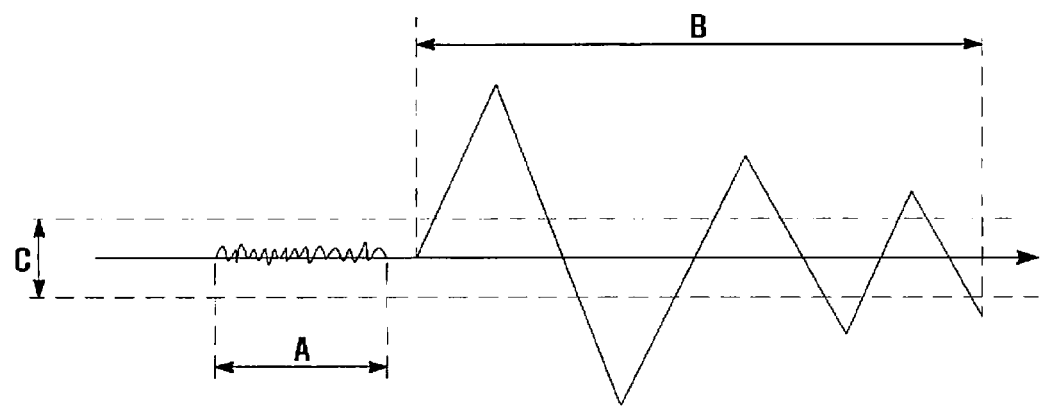
FIG. 2 is a graph illustrating an example of a sound input signal.

FIG. 2 is a graph illustrating an example of a sound input signal. As shown in FIG. 2, a sound input signal includes noise (A). To extract a meaningful signal (B), the sound recognition apparatus establishes a critical level (C) and removes minor signals under a critical level (C). Such a critical level (C) may be defined as a specified value through repeated experiments. Sound recognition using peak values positively or negatively greater than a critical level may allow a clear distinction between noise and a meaningful signal. This advantage may increase as a higher degree peak value is used.

After the removal of noises, peak values are extracted from a sound input signal. Peak values will now be described with reference to FIGS. 3A to 3C, which are graphs illustrating peak values.

Figure 3A:
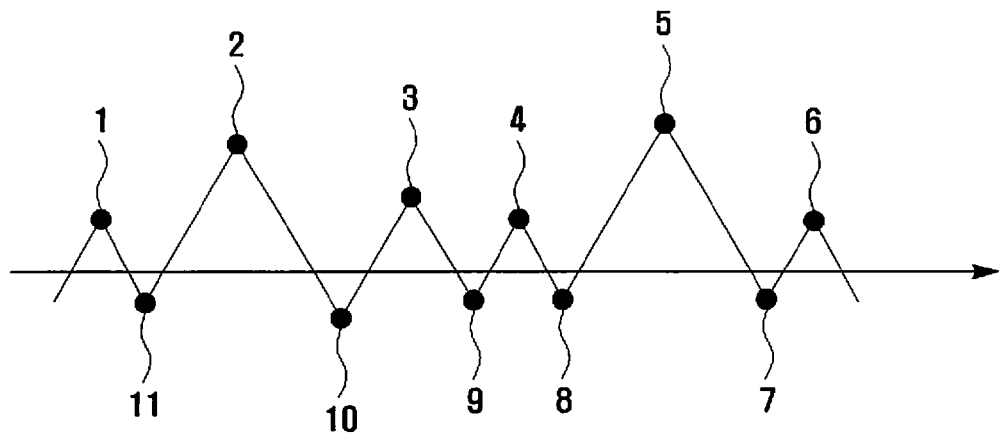
FIGS. 3A to 3C are graphs illustrating peak values.

FIG. 3A shows a sound signal from which a noise is removed. In FIG. 3A, reference numerals 1 to 11 indicate the first degree peak values. Here, reference numerals 1 to 6 indicate positive peak values, i.e., the relative maximum values, and reference numerals 7 to 11 indicate negative peak values, i.e., the relative minimum values. The following description uses positive peak values only.

Figure 3B:
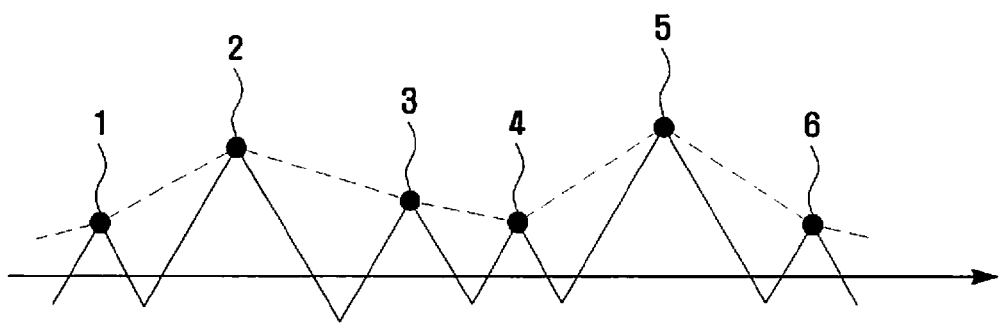
Figure 3C:
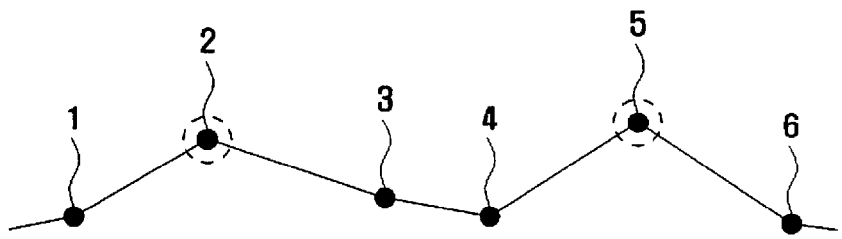

When all the first degree peak values (1 to 6) are connected to each other as shown in FIG. 3B, a new wave form is created as shown in FIG. 3C. From this wave form of the first degree peak values, the second degree peak values (2 and 5) are extracted. Similarly, the third degree peak values can be obtained from a wave form of the second degree peak values. Furthermore, in the same manner, the other sets of higher degree peak values can be continuously extracted from negative peak values.

Such higher degree peak values have several characteristics, as follows. A case where two or more peak values have the same level is excluded.

First, only one negative peak value exists between adjacent positive peak values. Similarly, only one positive peak value exists between adjacent negative peak values. Here, a case where a part of a wave form is a constant is excluded.

Second, the aforesaid first characteristic is applied to cases of higher degree peak values.

Third, higher degree peak values are smaller in number than lower degree peak values. Additionally, higher degree peak values are always included in lower degree peak values.

Fourth, at least one lower degree peak value exists between adjacent higher degree peak values.

Fifth, higher degree peak values have, on average, a greater level than lower degree peak values.

Sixth, a certain degree having the only one positive peak value and only one negative peak value exists in signals with a specified length (e.g., one frame).

Sound recognition of the invention uses the above-mentioned six characteristics of a sound input, so it is possible to obtain sets of peak values from the first degree to a certain higher degree.

Returning to FIG. 1, after the feature extraction unit 131 extracts peak values from a sound input, the statistics calculation unit 133 calculates statistical data of extracted peak values. Here, statistical data may be the arithmetic mean and the standard deviation. In the case of pre-stored base sounds, their peak values and statistical data are obtained and stored.

The sound comparison unit 135 determines whether a sound input is equal to a pre-stored base sound by using their statistical data. In an embodiment using a probability distance model, the sound comparison unit 135 calculates a probability distance using Equation (1).

Probability Distance=(Arithmetic mean of N-th Degree Peak Values of Sound Input−Arithmetic mean of N-th Degree Peak Values of Base Sound)/Average of Standard Deviation of N-th Degree Peak Values of Sound Input and Standard Deviation of N-th Degree Peak Values of Base Sound    (1)

As represented in Equation (1), the sound comparison unit 135 calculates, in specific degree peak values, the arithmetic mean of peak values of a sound input, the arithmetic mean of peak values of a base sound, and the difference between these arithmetic means. Also, the sound comparison unit 135 calculates the standard deviation of peak values of a sound input, the standard deviation of peak values of a base sound, and the average of these standard deviations. Then dividing the first calculated difference by the second calculated average, the sound comparison unit 135 obtains a probability distance.

A probability distance is a relative value representing the identity of a sound input and a base sound. In other words, a smaller probability distance means a stronger possibility of the same sounds. When a probability distance is greater than a specified value, both sounds are considered as different sounds. This comparison with the specialized value is preferably performed in the control unit 130. Therefore, sound recognition of the invention may use a critical value of a probability distance to determine whether a sound input and a base sound are the same sounds.

In another embodiment using a neural network model, the sound comparison unit 135 calculates a similarity. As well known in the art, a similarity can be calculated by using predefined hidden nodes and pre-stored features of a base sound while the arithmetic means and the standard deviations of positive and negative peak values from the first degree to the n-th degree are used as an input. Then, if a similarity is less than a specified value, a sound input and a base sound are considered as the same sounds.

Figure 4:
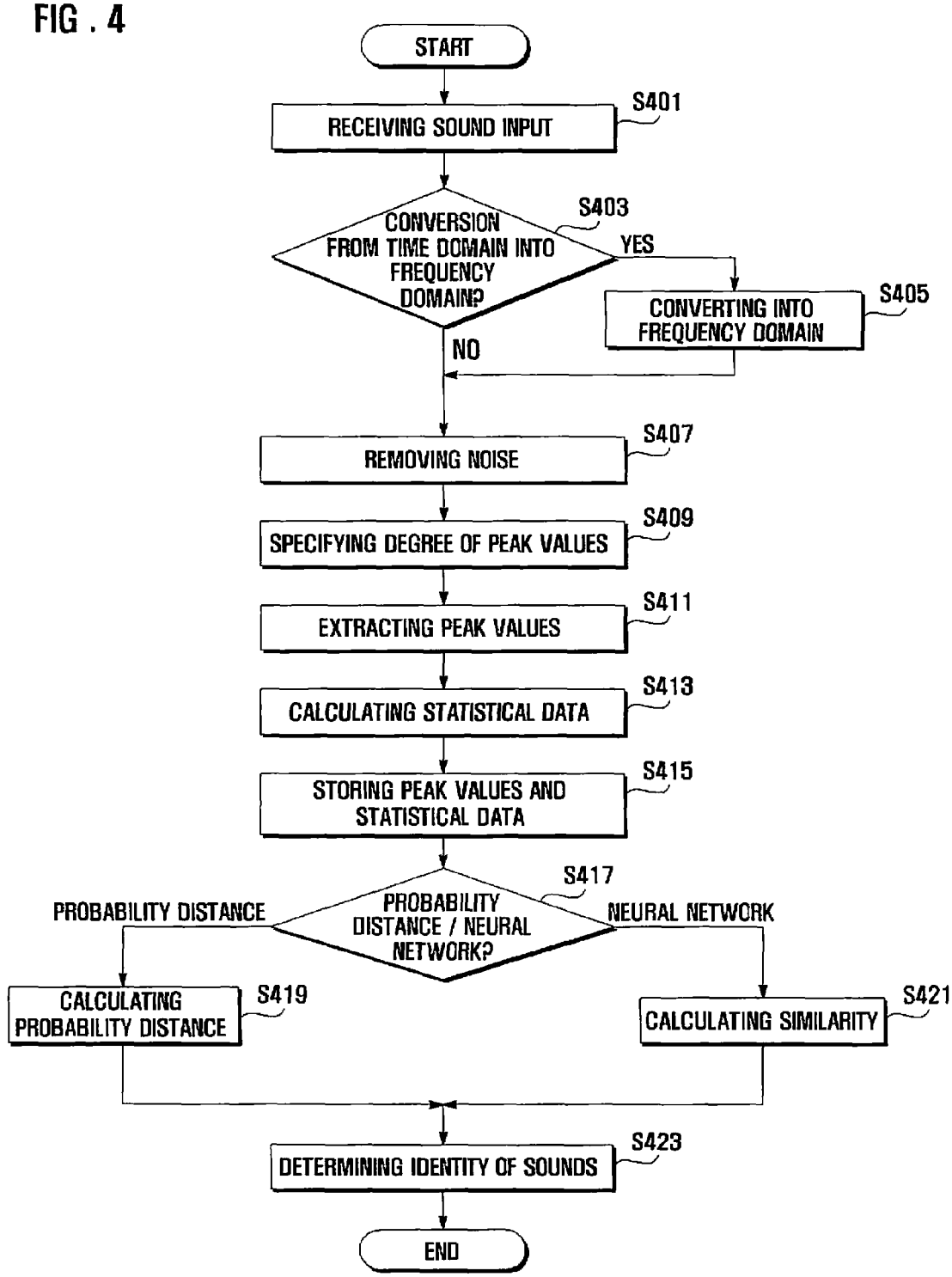
FIG. 4 is a flow diagram illustrating a sound recognition method in a portable device according to an exemplary embodiment of the present invention.

Hereinafter, a sound recognition method will be described with reference to FIG. 4. FIG. 4 is a flow diagram illustrating a sound recognition method in a portable device according to an exemplary embodiment of the present invention.

In this embodiment, and for exemplary purposes, a base sound is a doorbell sound. A doorbell sound has already been input into a portable device and then peak values from the first degree to the predefined degree have been extracted from a doorbell sound. Additionally, statistical data of peak values has been calculated and then peak values and their statistical data have been stored in the memory unit 120.

Referring to FIGS. 1 and 4, in step S401, the control unit 130 receives a sound input from the sound input unit 110. This sound input is a time domain signal. In step S403, the control unit 130 determines whether to convert a time domain signal into a frequency domain signal. This determination may depend on a user preference or a device setting.

If it is determined to convert into a frequency domain, the control unit 130 proceeds to step S405 and converts a time domain signal into a frequency domain signal. Preferably, Fast Fourier Transform (FFT) may be used for a conversion to a frequency domain.

Next, in step S407, the control unit 130 removes noise from the time domain signal or the frequency domain signal. As discussed above in FIG. 2, the removal of noise includes establishing a critical level and removing a minor signal below the critical level.

In addition to the above manner of removing a minor signal below the critical level by using a suitable filter, an alternative manner of excluding a minor signal below the critical level may be used. This embodiment may selectively employ either manner for the removal of noise. This noise removal may be executed by the feature extraction unit 131 of the control unit 130.

Next, in step S409, the control unit 130 specifies a degree of peak values to be extracted. Then, in step S411, the control unit 130 extracts peak values of a specified degree from a noise-removed sound input signal. Here, peak values include positive and negative peak values. The specified degree can be at least one degree, for example, the control unit 130 extracts the second degree peak values or extracts the first degree peak values and the second degree peak values.

The extraction of peak values as well may be executed by the feature extraction unit 131 of the control unit 130.

Next, in step S413, the control unit 130 calculates statistical data of peak values. In this embodiment, statistical data includes the arithmetic mean of peak values and the standard deviation of peak values.

If the control unit 130 extracts at least two degrees in step S411, the control unit 130 calculates at least two statistical data by using the peak values having at least two degrees in step S413.

Then, in step S415, the control unit 130 stores the arithmetic mean and the standard deviation in the memory unit 120. The calculation of statistical data may be executed by the statistics calculation unit 133 of the control unit 130.

Next, in step S417, the control unit 130 determines whether to use a probability distance model or a neural network model for the next determination of sound identity. This model determination may depend on a device maker's choice.

In case of using a probability distance model, the control unit 130 calculates a probability distance through Equation (1) in step S419. As discussed above, in specific degree peak values, the arithmetic mean of peak values of a sound input, the arithmetic mean of peak values of a base sound, and the difference between these arithmetic means are calculated. Also, the standard deviation of peak values of a sound input, the standard deviation of peak values of a base sound, and the average of these standard deviations are calculated. Then dividing the first calculated difference by the second calculated average, the control unit 130 obtains a probability distance. The probability distance is then compared with a critical value.

If a probability distance is less than a predefined critical value, the control unit 130 determines in step S423 that a sound input is equal to a base sound. If a probability distance is however not less than a predefined critical value, the control unit 130 determines in step S423 that a sound input is not equal to a base sound.

For example, let's suppose the arithmetic mean of peak values of a sound input is 10, the arithmetic mean of peak values of a base sound is 8, and the average of the standard deviations of peak values of the highest degree of both sounds is 2, respectively. Accordingly, a probability distance becomes 1 according to Equation (1). If a predefined critical value is 2, a probability distance is less than a predefined critical value and therefore the control unit 130 determines that a sound input is equal to a base sound. In other words, if a sound input is a pre-stored doorbell sound, a probability distance lower than a critical value can be obtained. However, if a sound input is different from a pre-stored doorbell sound, a probability distance becomes greater than a critical value.

In case of using a neural network model, the control unit 130 calculates a similarity in step S421. As discussed above, a similarity can be calculated by using predefined hidden nodes and pre-stored features of a base sound while the arithmetic means and the standard deviations of positive and negative peak values from the first degree to the n-th degree are used as an input.

If a similarity is less than a predefined critical value, the control unit 130 determines in step S423 that a sound input is equal to a base sound. If a similarity is however not smaller than a predefined critical value, the control unit 130 determines in step S423 that a sound input is not equal to a base sound.

The control unit 130 can determine the sound input as one of the base sound by using the at least two statistical data in step S419, S421, and S423.

As fully described above, statistical data of higher degree peak values as well as the first degree peak values may be helpful to the extraction of features. If no critical level or value is applied, such statistical data may be similar in characteristics to statistical data of conventional zero-crossing technique. However, since peak values exist above noises, statistical data of peak values has noise-tolerant characteristics in comparison with zero-crossing technique which may be buried in noises.

In general a burden of algorithm calculation is characterized by a required amount of memory and an operation count. Since the extraction of peak values in the present invention only needs integer operation that extracts peak values of an integer, this invention can reduce a required amount of memory and an operation count in comparison with conventional floating point algorithm that needs to compute floating values. Also, the present invention can be free from round-off errors that may occur frequently in sum computation of a floating point algorithm. Furthermore, since the first peak extraction is a very simple operation requiring only a comparison operation of two data points, and also a higher degree peak extraction is a similar comparison operation, a burden of computations in the present invention can be remarkably reduced in comparison with conventional feature extraction techniques.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for recognizing a required sound from a user among a plurality of sounds in a portable device, the method comprising:
    receiving, by a sound input unit, a sound input;
    extracting peak values of the sound input, the peak values having positive and negative peak values;
    calculating, by the portable device, a statistical data value by using the peak values; and
    determining the sound input as one of base sounds stored in a memory unit based on the calculated statistical data value.

2. The method of claim 1, wherein the extracting step comprises removing minor signals under a predefined critical level from the sound input to extract the peak values with the minor signals removing and, the statistical data value is calculated by using the peak values with the minor signals removed.

3. The method of claim 1, wherein the statistical data value is a mean value of positive and negative peak values calculated respectively.

4. The method of claim 1, wherein the statistical data value is calculated by using the positive peak values.

5. The method of claim 1, wherein the statistical data value is calculated by using the negative peak values.

6. The method of claim 1, wherein extracting the peak values of the sound input comprises:
    extracting the peak values having at least two degrees;
    calculating at least two statistical data values by using the peak values having at least two degrees; and
    determining the sound input as one of the base sounds by using the at least two statistical data value.

7. The method of claim 6, wherein extracting the peak values having at least two degrees comprises:
    extracting a lower degree of the peak values from the sound input;
    connecting all the lower degree peak values to each other to form a new wave form; and
    extracting a higher degree peak values from the new wave form.

8. The method of claim 1, wherein the sound input is a time domain signal.

9. The method of claim 1, wherein the sound input is a frequency domain signal.

10. The method of claim 1, wherein the determining step comprises calculating a probability distance by using the statistical data and determining that the sound input is equal to the base sound when the probability distance is less than a predefined critical value.

11. The method of claim 1, wherein the determining step comprises calculating a similarity based on a neural network model by using the statistical data and determining that the sound input is equal to the base sound when the similarity is less than a predefined critical value.

12. A portable device for recognizing a required sound from a user among a plurality of sounds, the apparatus comprising:
    a memory unit for storing base sounds;
    a sound input unit for receiving a sound input; and
    a control unit for controlling to receive the sound input from the sound input unit, extracting peak values of the sound input, the peak values having positive and negative peak values, calculating a statistical data value by using the peak values, and determining the sound input as one of the base sound based on the calculated statistical data.

13. The apparatus of claim 12, wherein the peak values are extracted together with minor signals below a predefined critical level being removed from the sound input, and the statistical data value is calculated using the peak values with the minor signals removed.

14. The apparatus of claim 12, wherein the statistical data value is a mean of positive and negative peak values calculated respectively.

15. The apparatus of claim 12, wherein the statistical data value is calculated by using the positive peak values.

16. The apparatus of claim 12, wherein the statistical data value is calculated by using the negative peak values.

17. The apparatus of claim 12, wherein the control unit extracts the peak values having at least two degrees, calculates at least two statistical data values by using the peak values having at least two degrees, and determines the sound input as one of the base sound by using the at least two statistical data values.

18. The apparatus of claim 17, wherein the control unit, which extracts the peak values having at least two degrees, extracts a lower degree of the peak values from the sound input, connects all the lower degree peak values to each other to form a new wave form, and extracts a higher degree peak values from the new wave form.

19. The apparatus of claim 12, wherein the statistical data value includes the arithmetic mean of the peak values and the standard deviation of the peak values.

20. The apparatus of claim 12, wherein the sound input is a time domain signal.

21. The apparatus of claim 12, wherein the sound input is a frequency domain signal.

22. The apparatus of claim 12, wherein the control unit calculates a probability distance by using the statistical data value and determines that the sound input is equal to the base sound when the probability distance is less than a predefined critical value.

23. The apparatus of claim 12, wherein the control unit calculates a similarity based on a neural network model by using the statistical data value and determines that the sound input is equal to the base sound when the similarity is less than a predefined critical value.

* * * * *